(12) United States Patent
    Miglioranza

(10) Patent No.: US 10,668,982 B2
(45) Date of Patent: Jun. 2, 2020

(54) METHOD FOR CONTROLLING A MOTOR OF A DERAILLEUR OF A BICYCLE ELECTRONIC GEARSHIFT, AND COMPONENT SUITABLE FOR CARRYING OUT SUCH A METHOD

(71) Applicant: CAMPAGNOLO S.r.l., Vicenza (IT)

(72) Inventor: Federico Miglioranza, Schio Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 191 days.

(21) Appl. No.: 15/661,790

(22) Filed: Jul. 27, 2017

(65) Prior Publication Data

US 2018/0029668 A1    Feb. 1, 2018

(30) Foreign Application Priority Data

Jul. 29, 2016 (IT) .......................... 102016000080244

(51) Int. Cl.
*B62M 9/122* (2010.01)
*B62M 9/132* (2010.01)
*H02P 21/22* (2016.01)
*B62M 25/08* (2006.01)
*H02P 6/08* (2016.01)
*B62M 9/1244* (2010.01)
*H02P 7/03* (2016.01)
(Continued)

(52) U.S. Cl.
CPC .......... *B62M 9/122* (2013.01); *B62M 9/1244* (2013.01); *B62M 9/132* (2013.01); *B62M 25/08* (2013.01); *H02P 6/06* (2013.01); *H02P 6/085* (2013.01); *H02P 7/04* (2016.02); *H02P 7/2855* (2013.01); *H02P 21/22* (2016.02)

(58) Field of Classification Search
CPC .......... B62M 9/122; B62M 9/132; H02P 21/22
See application file for complete search history.

(56) References Cited

U.S. PATENT DOCUMENTS 3,767,195 A * 10/1973 Dimick ................. A61B 5/221
                                                    482/5
2005/0239587 A1   10/2005 Ichida et al.
2014/0039742 A1    2/2014 Tanaka et al.
(Continued)

FOREIGN PATENT DOCUMENTS

CN      202034946 U  * 11/2011  .............. H02P 27/06
CN      204161147 U  *  2/2015  .............. B62M 6/45
(Continued)

OTHER PUBLICATIONS

Machine translation of CN202034946U filed Apr. 26, 2019 (Year: 2019).*

(Continued)

*Primary Examiner* — Tisha D Lewis
(74) *Attorney, Agent, or Firm* — Volpe and Koenig, P.C.

(57) ABSTRACT

A method for controlling a motor of a derailleur of a bicycle electronic gearshift during a displacement from an initial position (A) towards a destination position (B) includes the step of feedback controlling the current (I(t)) absorbed by the motor. A controller of an electric motor of a derailleur of a bicycle electronic gearshift is configured to carry out a feedback control of the current (I(t)) absorbed by the motor during a displacement from an initial position (A) towards a destination position (B).

22 Claims, 10 Drawing Sheets

(51) Int. Cl.
*H02P 6/06* (2006.01)
*H02P 7/285* (2016.01)

(56) References Cited

U.S. PATENT DOCUMENTS

| | | |
|---|---|---|
| 2014/0087901 A1 | 3/2014 | Shipman et al. |
| 2014/0225542 A1* | 8/2014 | Omata .................... H02P 21/22 |
| | | 318/400.09 |
| 2015/0006043 A1* | 1/2015 | Miglioranza .......... B62M 9/122 |
| | | 701/51 |
| 2015/0246685 A1 | 9/2015 | Dixon et al. |
| 2019/0031290 A1* | 1/2019 | Kurokawa ............. B62K 23/06 |

FOREIGN PATENT DOCUMENTS

| | | | |
|---|---|---|---|
| EP | 1514792 A1 | 3/2005 | |
| EP | 2690001 A1 | 1/2014 | |
| JP | 2002053091 A | 2/2002 | |
| JP | 2002345101 A * | 11/2002 | ............ B60L 3/0046 |

OTHER PUBLICATIONS

Machine translation of CN 204161147U filed Sep. 28, 2019 (Year: 2019).*
Italian Search Report and Written Opinion in Italian Application No. 102016000080244, dated May 11, 2017, with English translation.
Danielle Collins: "FAQ: What are servo motor current, velocity and position loops and bandwidths?", Motion Control Tips, Jun. 9, 2016 (Jun. 9, 2016), XP055669001.
Office Action for Chinese Patent Application 201710631629.X (Dated Mar. 2, 2020).

* cited by examiner

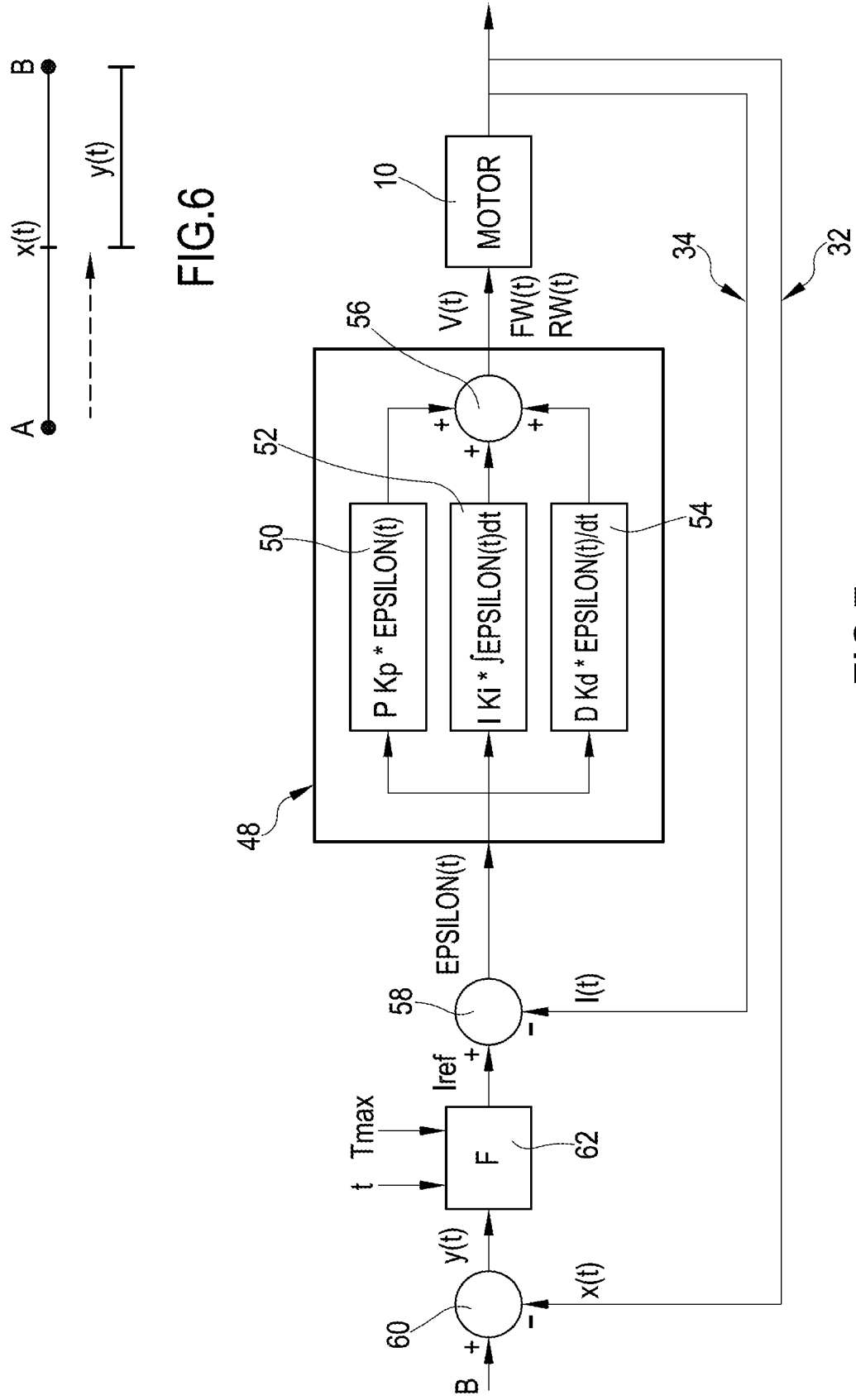

METHOD FOR CONTROLLING A MOTOR OF A DERAILLEUR OF A BICYCLE ELECTRONIC GEARSHIFT, AND COMPONENT SUITABLE FOR CARRYING OUT SUCH A METHOD

CROSS REFERENCE TO RELATED APPLICATION

This application claims the benefit of Italian Application No. 102016000080244, filed on Jul. 29, 2016, which is incorporated herein by reference as if fully set forth.

FIELD OF INVENTION

The present invention relates to a method for controlling a motor of a derailleur of a bicycle electronic gearshift, and a component suitable for carrying out such a method.

BACKGROUND

A motion transmission system in a bicycle comprises a chain extending between toothed wheels associated with the axle of the pedal cranks and with the hub of the rear wheel. When there is an assembly of toothed wheels comprising more than one toothed wheel at at least one of the axle of the pedal cranks and the hub of the rear wheel, and the motion transmission system is therefore provided with a gearshift, a front derailleur and/or a rear derailleur are provided for.

In order to increase the speed and precision with which gearshifting can be carried out, so-called electronic gearshifts, or more correctly electronically servo-assisted gearshifts, have become common.

In case of an electronically servo-assisted gearshift, each derailleur comprises a guide element—also called chain guide or cage or, in case of a rear derailleur, rocker arm—movable to displace the chain among the toothed wheels in order to change the gear ratio, and an electromechanical actuator to displace the chain guide. The actuator in turn typically comprises a motor, typically an electric motor, coupled with the chain guide through a linkage such as an articulated parallelogram, a rack system or a worm screw system, as well as a sensor or transducer of the position, speed, acceleration and/or direction of rotation, of the rotor or of any mobile part downstream of the rotor, down to the chain guide itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons.

A device or unit for controlling the front derailleur and a device or unit for controlling the rear derailleur—or only one of the two in case of simpler gearshifts—are mounted so as to be easily maneuvered by the cyclist, normally on the handlebars, close to the handgrips thereof where the brake lever is also located for controlling the brake of the front and rear wheel, respectively. Control devices that allow driving both a derailleur in the two directions and a brake are commonly called integrated controls.

It is in general known to drive the derailleur of a bicycle gearshift with reference to values of a table of command values, each correlated to a position of the derailleur in which engagement of the chain with a specific toothed wheel occurs, or there is the engagement. In other words, the control electronics or controller uses the table of command values to obtain the value that a variable of the derailleur must take to position the chain in engagement with the desired toothed wheel. Such a value can be a differential value with respect to the adjacent toothed wheel, or it can be an absolute value with respect to a reference, for example with respect to a reference toothed wheel or to an end of stroke condition or a condition of lack of excitation of the motor.

From the point of view of magnitude, an actuator command value of the table of values can be, for example, the distance traveled by a mobile point taken as reference on the derailleur, the number of steps or revolutions that the motor should be made to perform, a length of excitation time of the motor, the value of a supply voltage of a motor having an excursion proportional to the voltage, or furthermore it can be the value emitted by the sensor or transducer associated with the motor, a numerical value stored in a register and representative of one of the aforementioned quantities, etc.

In particular, the motors of actuators can be driven for a number of steps or for a length of excitation time or with a voltage that are appropriate for each upward or downward gearshifting and then stopped automatically, while the sensors are used to provide a feedback signal to the control electronics so that it can possibly take care of actuating the motors of the actuators again in case the intended position has not been reached, namely in case the aforementioned variable of the derailleur has not taken the table value. This may, for example, be due to the fact that the resistance torque offered by the derailleur, which is to a certain extent dependent on how the cyclist is pedaling, was too high, greater than the maximum torque able to be delivered by the motors through the linkage.

The values of said table of command values are nominal values, set in the factory, which take the number of toothed wheels in the derailleur (front or rear) and the respective thicknesses and pitches into account. Typically, such nominal values provide that, in the absence of the actuator driving signal, namely with command value at zero, the chain is in engagement with the toothed wheel having the smallest diameter, although, as can be seen from the aforementioned examples, this condition is not necessary.

It is also known to drive the electric motor of the derailleur through a voltage controlled over time according to a certain predetermined profile.

The predetermined profile of the drive voltage of the motor is feedback controlled based on the residual distance from the destination position. For this purpose, the derailleur typically comprises the aforementioned position sensor, suitable for detecting the instantaneous position of the drive shaft or of a shaft or other component set into rotation or more in general in motion by the drive shaft. The residual distance is calculated as the difference between the destination position read from the table of command values and the current position detected by the sensor, which are assumed to be homogeneously expressed.

In order to obtain an adequately smooth movement, the profile of the drive voltage is typically an inverse quadratic function of the residual distance. Therefore, as the destination position is approached, the drive voltage of the motor decreases.

It is also known to monitor the time elapsed since the starting of the electric motor for the derailleur displacement, and to interrupt the power supply to the electric motor in any case once a time limit has been exceeded, so as to protect the motor itself and the components in case some jamming or other mechanical impediment causes an excessive resistance that the motor is unable to overcome, and therefore prevents the desired displacement.

The technical problem at the basis of the present invention consists of improving the control of the motor of a derailleur of a bicycle electronic gearshift.

SUMMARY

In one aspect, the invention relates to a method for controlling a motor of a derailleur of a bicycle electronic gearshift during a displacement from an initial position towards a destination position, characterized by comprising the step of feedback controlling the current absorbed by the motor.

The Applicant has indeed recognized that the current absorbed by the motor is representative of the torque delivered by the motor, and that optimizing the torque delivered by the motor during the displacement allows higher performance for the speed transmission system to be obtained, and allows better use of electrical energy.

The method outlined above further allows protecting the mechanisms, in particular to obtain less mechanical degradation over time, as well as to obtain for example very "smooth" derailleur displacements or gearshifting.

The displacement from an initial position towards a destination position can in particular correspond to the displacement of the derailleur between a position at a first toothed wheel and a position at a second toothed wheel to change gear ratio.

In the present description and in the attached claims, under position "at a toothed wheel" it is herein meant to indicate a position of the derailleur in which the engagement of the chain with a specific toothed wheel occurs, or there is the engagement.

In the present description and in the attached claims, it is presumed that the motion of the electric motor is transferred rigidly at least down to the member with which the position sensor is associated.

However, the displacement from an initial position towards a destination position can in general be any other displacement necessary during a step of installation and/or configuration and/or adjustment and setting of the bicycle electronic gearshift.

Preferably, the method comprises the step of providing, as unit of measurement of the displacement, an elementary rotation of a drive shaft or of a shaft driven into rotation by the motor.

More preferably, the elementary rotation is a sub-multiple of a complete revolution.

Preferably, the step of feedback controlling comprises controlling a drive voltage of the motor so that an error defined by a difference between a reference current and a measured absorbed current tends to become zero.

An automatic control is therefore carried out, wherein the derailleur is the system to be controlled, the drive voltage is the control variable, the measured absorbed current is the measured process variable, and the reference current is the setpoint, namely the desired output of the derailleur that the automatic control aims to reach.

The control of the drive voltage of the motor is preferably a negative feedback control.

In the simplest embodiments, the method comprises defining the reference current as a constant value, independent both of the time elapsed since the start of the displacement from the initial position towards the destination position, and of the residual distance from the destination position.

An advantage of such a reference current is its simplicity.

In order to further improve performance, the reference current is variable.

In other embodiments, the method comprises defining the reference current as a function of time, more in particular a direct function of the time elapsed since the start of the displacement from the initial position to the destination position.

In this way it is possible to define a predetermined profile over time of the desired absorbed current, and therefore, thanks to the aforementioned control and in particular to the negative feedback control, a trend of the actually absorbed current and of the torque actually delivered by the motor that corresponds to or anyhow approaches such a predetermined profile. For example, it is possible to provide for an initially increasing and then decreasing trend during a predetermined time interval; or a trend as better described hereinafter.

In other embodiments, the method comprises defining the reference current as a function of the residual distance from the destination position, but not a direct function of the time elapsed since the start of the displacement from the initial position to the destination position.

In the present description and in the attached claims, with the expression "function of the residual distance from the destination position", "not a direct function of time" it is meant to account for the fact that the residual distance changes over time, and therefore the reference current defined as a function of the residual distance from the destination position is, as a matter of fact or indirectly, a function of the elapsed time. The reference current is therefore expressed in terms of an independent variable that represents the residual distance, but not in terms of an independent variable that represents time.

In this way, the profile of the desired absorbed current, which is then at least approximated by the actually absorbed current, is predetermined in space. For example, it is possible to provide a trend of the delivered torque that increases for an initial part of the displacement, then is constant and then decreases as the destination position approaches.

In more complex embodiments, the method comprises defining the reference current as a function both of the time elapsed since the start of the displacement from the initial position to the destination position, and of the residual distance from the destination position.

As stated above, the residual distance in turn changes over time, but in this case it is meant to indicate that the reference current is expressed in terms of an independent variable that represents the residual distance, and of an independent variable that represents the elapsed time.

For example, when the reference current is a function only of the elapsed time or also of the elapsed time, it is possible to define the reference current as a monotonically increasing function of the elapsed time, at least in an initial time interval of the displacement, so as to predefine the delivered torque so that it increases uniformly and thus to stress less the mechanisms.

More preferably, it is possible to define the reference current as an inverse quadratic function of the time elapsed since the start of the displacement from the initial position, at least in an initial time interval of the displacement.

Alternatively, it is possible to define the reference current as a quadratic or parabolic function of the time elapsed since the start of the displacement from the initial position, at least in an initial time interval of the displacement.

Alternatively, it is possible to define the reference current as a ramp function of the time elapsed since the start of the displacement from the initial position, at least in an initial time interval of the displacement. Such a trend allows obtaining a "soft-start" that stresses little the battery when the motor is started.

Alternatively or in addition, it is possible to define the reference current as a monotonically decreasing function of the elapsed time at least in a non-initial time period of the displacement, so as to predefine the delivered torque so that it decreases uniformly, and thus to stress less the mechanisms in a step, for example a final step, of the displacement.

Furthermore, it is possible to define the reference current by a constant value for a predetermined time interval during the displacement, in particular in an initial time interval of the displacement.

In this way, it is possible to start or attempt to start the displacement in a predetermined manner, deferring the possible evaluations of the reaction of the mechanisms to a second part of the displacement.

Preferably, the constant value is defined as an intermediate value with respect to the maximum possible value for the reference current for the rest of the displacement. In this way, at the end of the predetermined time interval, an abrupt transition of the value of the reference current is in general provided, and in particular a sudden rise of the reference current, which allows providing a torque boost to try to overcome a possible temporary impediment to the movement of the mechanisms.

When the reference current is a function only or also of the residual distance from the destination position, it is possible to define the reference current as a monotonically increasing function of the residual distance, at least in a final part of the displacement, and therefore a function that progressively decreases as the destination position is approached. The delivered torque is therefore controlled so that it decreases uniformly, and therefore the mechanisms are less stressed.

More preferably, it is possible to define the reference current as an inverse quadratic function of the residual distance, at least in a final part of the displacement.

Preferably, in the various embodiments the method comprises defining a maximum value for the reference current equal to a predetermined percentage of a maximum current deliverable by the motor, more preferably equal to 50% of the maximum current deliverable by the motor.

By limiting the motor in torque, the maximum force produced at the mechanisms is limited, and therefore unwanted stresses thereof are avoided.

Preferably, in the various embodiments the method comprises defining the reference current as a function having zero value at zero residual distance.

Such functions have the advantage of ending the displacement with an effective damping of the torque generated by the motor.

Preferably, in the various embodiments the method further comprises the step of interrupting the power supply to the motor after a time limit, irrespective of whether the destination position has been reached or not, namely whether the residual distance is zero or not.

In this way, it is possible to protect the motor itself and the components in case some jamming or other mechanical impediment causes an excessive resistance that the motor is unable to overcome, and therefore prevents the desired displacement. The charge of the battery for supplying power to the motor is also spared.

Preferably, in the various embodiments the method further comprises the step of progressively checking whether the destination position has been reached, namely if the residual distance is zero, and in the affirmative case the step of interrupting the excitation of the motor.

More preferably, the method further comprises the step of keeping the motor still until said time limit after the destination position has been reached, namely after the residual distance has become zero.

Preferably, the step of feedback controlling the current absorbed by the motor comprises a Proportional-Integral-Derivative control.

Preferably, the step of feedback controlling the current absorbed by the motor comprises measuring the absorbed current and filtering the measured absorbed current, more preferably analogically and/or digitally filtering.

For example, the filtering of the measured absorbed current can comprise calculating a moving average and/or reading the position plural times, discarding some readings considered not significant.

Preferably, the method further comprises feedback controlling the residual distance from the destination position, said feedback controlling in feedback the residual distance being carried out in an external control loop with respect to said feedback controlling the current absorbed by the motor.

Preferably, the step of feedback controlling the residual distance comprises detecting the current position and filtering the detected current position, more preferably analogically and/or digitally filtering.

For example, the filtering of the position can comprise calculating a moving average and/or reading the position plural times, discarding some readings considered not significant.

Preferably, the method comprises a step, preliminary to a step of displacement attempt, of carrying out integrity checks of a controller of the motor, and in the negative case aborting the displacement and signaling anomalies.

Alternatively or in addition, preferably the method comprises a step, subsequent to a step of displacement attempt, of checking whether the destination position has been reached within a certain tolerance, and in the negative case aborting the displacement and signaling an anomaly.

In a second aspect, the invention relates to a derailleur of a bicycle electronic gearshift comprising an electric motor and a controller of the electric motor, characterized in that the controller of the electric motor is configured to carry out a feedback control of the current absorbed by the motor during a displacement from an initial position towards a destination position.

In the present description and in the attached claims, under the term "controller" a logic unit shall be meant to be indicated, which can nevertheless be formed of plural physical units, in particular of one or more distributed microprocessors that can be contained in one or more cases together with one or more of the other components of the bicycle gearshift.

In a third aspect, the invention relates to an assembly of a derailleur of a bicycle electronic gearshift comprising an electric motor, and of a controller of the electric motor external to the derailleur, characterized in that the controller of the electric motor is configured to carry out a feedback control of the current absorbed by the motor during a displacement from an initial position towards a destination position.

In a fourth aspect, the invention relates to a bicycle electronic gearshift comprising at least one derailleur having an electric motor, and a controller of the electric motor, said at least one derailleur being intended to move a chain between toothed wheels of a set of toothed wheels associated with the axle of the pedal cranks or with the hub of the rear wheel of a bicycle, respectively, characterized in that the controller of the electric motor is configured to carry out a feedback control of the current absorbed by the motor during a displacement from an initial position towards a destination position.

Preferred features of the second, third and fourth aspect of the invention are as follows.

Preferably, the controller of the electric motor carries out a feedback control of the residual distance from the destination position, said feedback control of the residual distance being an external control loop with respect to said feedback control of the current absorbed by the motor.

Preferably, the controller comprises an H bridge for driving the electric motor and a shunt connected to the lower side of the H bridge to draw a current representative of the current to be measured.

More preferably, the controller comprises an analog filter to filter the current drawn by the shunt.

Even more preferably, the controller comprises an operational amplifier to amplify the current drawn by the shunt and preferably filtered.

Preferably, the controller comprises a microcontroller configured to digitally filter the quantity representative of the measured current and/or the quantity representative of the detected position.

Preferably, the controller comprises a microcontroller configured to carry out one or more of the steps of the method outlined above.

BRIEF DESCRIPTION OF THE DRAWINGS

Further features and advantages of the present invention will become clearer from the following detailed description of some preferred embodiments thereof, made with reference to the attached drawings. The different features illustrated and described with reference to the single configurations can be combined with each other as desired. In the following description, for the illustration of the figures identical or similar reference numerals are used to indicate constructive or functional elements with the same function or an analogous function. In the drawings:

FIG. 6 is a schematic representation of the method for controlling the motor according to an embodiment of the invention, FIG. 7 is a schematic representation of the control of the motor according to the invention.

DETAILED DESCRIPTION OF THE PREFERRED EMBODIMENT(S)

In the following description, for the sake of brevity reference will sometimes be made to quantities such as current, position, time etcetera instead of to the signals or values of variables representative thereof.

Figure 1:
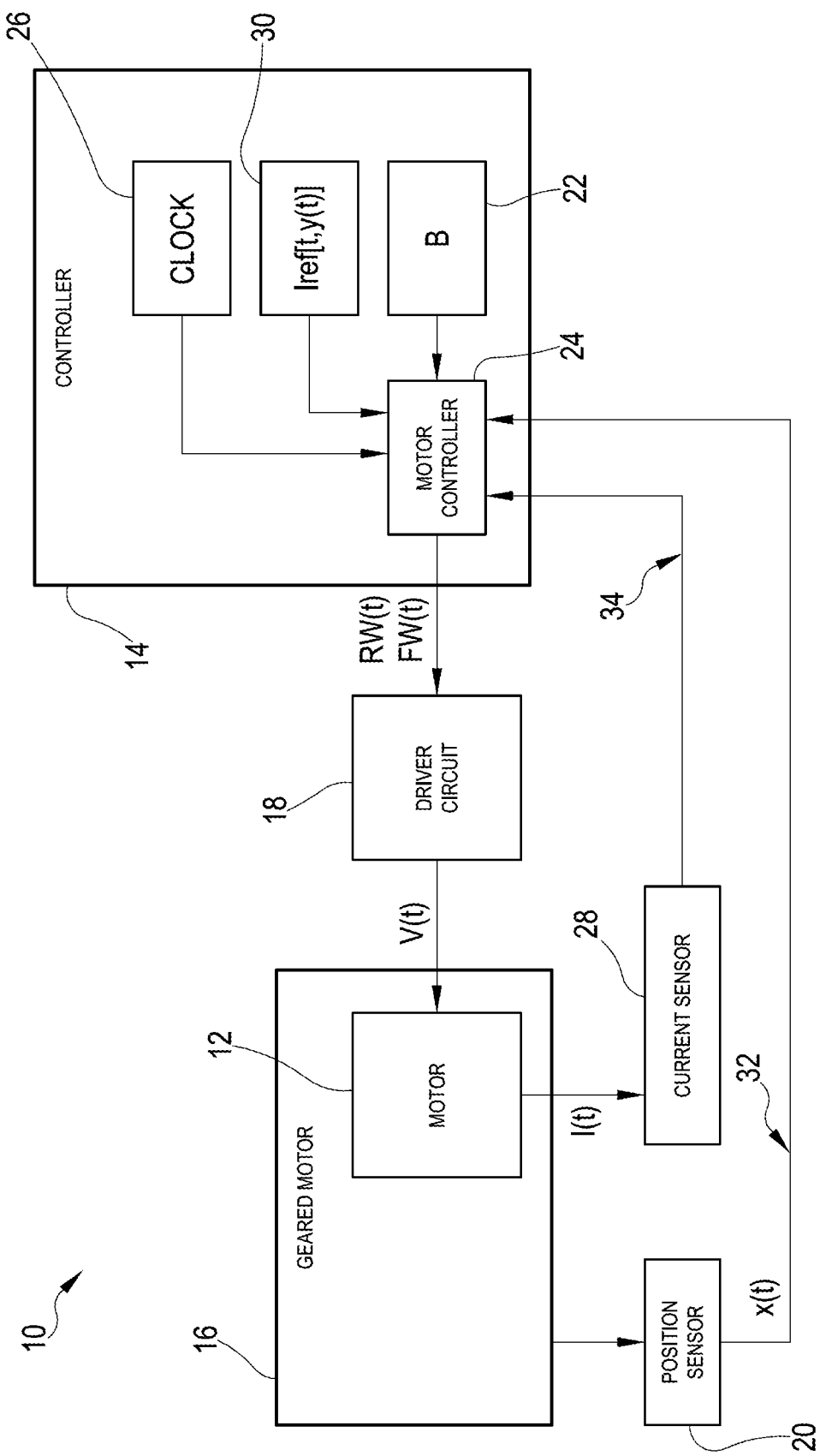
FIG. 1 is a block diagram related to the main components of a derailleur of a bicycle electronic gearshift according to the invention.

FIG. 1 shows a block diagram related to the main components of a derailleur 10 of a bicycle electronic gearshift according to the invention.

The derailleur 10 comprises first of all an electric motor 12 and a controller 14.

Typically, the electric motor 12 is part of a geared motor 16, which further comprises a gear train (not shown) operatively arranged between a drive shaft of the electric motor 12 and an output shaft of the geared motor 16. The gear train can comprise for example a plurality of toothed members, engaged in pairs and/or coaxial and co-rotating in pairs and/or a worm screw.

The gear train is configured to suitably reduce the rotation speed of the output shaft of the geared motor 16 with respect to the rotation speed of the drive shaft of the electric motor 12, and the reduction ratio is given in a per se well known manner by the number and type of gears used, as well as by parameters such as for example the number of teeth of the toothed members of the gear train.

The derailleur 10 further comprises, typically, a driver circuit 18 of the motor 12.

The driver circuit 18 drives the motor 12 through a suitable drive signal, as discussed in the introductory part of the present description. Typically, the driver circuit 18 drives the motor 12 through a voltage signal V(t) that is variable over time.

Typically, moreover, the derailleur 10 comprises a position sensor 20, of the rotor or of any movable part downstream of the rotor, down to the chain guide itself, as discussed in the introductory part of the present description.

The position sensor 20 is preferably any sensor suitable for detecting the instantaneous position of the drive shaft of the electric motor 12 or of a shaft or another component of the geared motor 16 set into rotation or more generally in motion by the drive shaft.

The controller 14 of the derailleur 10 is embodied by at least one processor—typically a microprocessor or a microcontroller—suitable for implementing one or more method steps, by providing for suitable procedures and/or hardware, software and/or firmware modules, to control the components of the derailleur 10 and/or to control the data communication between the derailleur 10 and other components of a bicycle gearshift.

The controller 14 is configured, in particular, to receive from a central controller or from a manual control device—or even to autonomously calculate—a displacement command of a chain guide (not shown) of the derailleur, for example a command for displacement of the chain guide of the derailleur between a position at a first toothed wheel and a position at a second toothed wheel to change gear ratio. For the sake of brevity, in the present description and in the attached claims reference will sometimes be made to a displacement of the derailleur, meaning a displacement of the chain guide of the derailleur.

In the block diagram of FIG. 1, a module 22 representative of a destination position B is shown. The position B is represented in an omologous quantity with respect to the position detected by the position sensor 20, which is indicated as x(t). By omologous quantities it is meant to indicate that the two magnitudes are expressed in the same unit of measurement.

Preferably, the predetermined unit of measurement is an elementary rotation of the shaft or other component set into rotation with which the sensor 20 is coupled. More preferably, the elementary rotation is a sub-multiple of a complete revolution.

As far as the present invention is concerned, the controller 14 of the derailleur 10 comprises in particular a module 24 for controlling the motor 12 or motor controller 24, which emits a suitable signal for the driver circuit 18.

The position sensor 20 transmits the detected position x(t) to the controller 14, in particular to the module 24 for controlling the motor 12.

A module or clock 26 configured to emit a timing signal for the module 24 for controlling the motor 12 and in general for the controller 14 is also shown.

According to the invention, a current sensor 28 and a module 30 for setting a reference current Iref are also provided for.

In particular, the current sensor 28 is configured to measure the current I(t) actually absorbed by the motor 12.

Alternatively and as better described hereinafter with reference to FIG. 2, the current I(t) actually absorbed by the motor 12 can be measured by connecting the current sensor 28 at the driver circuit 18, in "parallel" to the motor 12.

The current sensor 28 transmits the measured absorbed current I(t) to the controller 14, in particular to the control module 24 of the electric motor 12.

While according to the prior art the motor controller 24 emits the control signal of the driver circuit 18 solely based on the destination position B and the position x(t) detected by the sensor 20 in one of the manners discussed in the introductory part of the present description, according to the invention the module 24 for controlling the electric motor 12 emits the control signal of the driver circuit 18 also based on the measured absorbed current I(t).

In greater detail, the controller 14 of the present invention and in particular the module 24 for controlling the motor is configured to carry out a double feedback control during a displacement of the derailleur 10 from an initial position A towards a destination position B (cf. FIG. 6): in an external feedback loop 32, the position x(t) is feedback controlled in an analogous manner with respect to the prior art; in an internal feedback loop 34, the current I(t) absorbed by the motor 12 is feedback controlled.

As discussed in the introductory part of the present description, the current I(t) absorbed by the motor 12 is representative of the torque delivered by the motor 12. The internal feedback loop 34 therefore allows the torque delivered by the motor 12 during the displacement of the derailleur 10 to be optimized, for example in order to protect the mechanisms, as well as to obtain for example very "smooth" derailleur displacements or gearshifting.

In FIG. 1, the timing signal or clock 26, the value of the reference current Iref and/or the destination position B have been shown as implemented by modules that are part of the controller 14, but they could be external to the controller 14 and supplied as an input to the controller 14.

The motor controller 24 could alternatively be external to the derailleur 10, for example embodied in a central controller of an overall bicycle gearshift.

Figure 2:
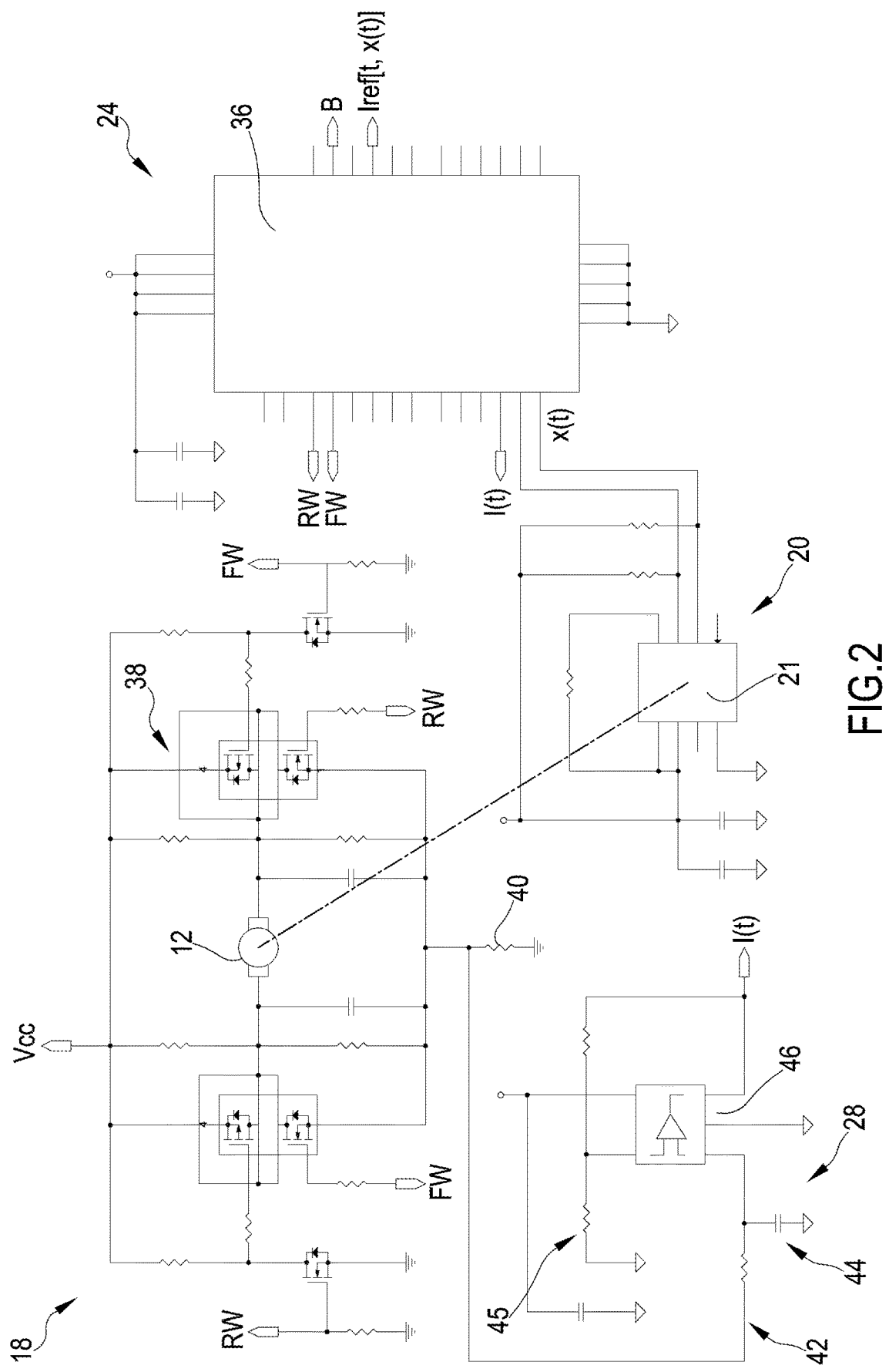
FIG. 2 is an electrical schematic related to an exemplary embodiment of the derailleur of FIG. 1, FIGS. 3-5 are flow charts related to a method for controlling a motor of a derailleur according to the invention.

FIG. 2 shows an electrical schematic related to the main components of a derailleur 10 according to a specific embodiment, provided merely as an example.

In such an embodiment, the motor controller 24 is implemented by a microcontroller 36, the driver circuit 18 is implemented by an H bridge 38, the current sensor 28 is implemented by a shunt 40 connected to the lower side of the H bridge, and the position sensor 20 is implemented by a second microcontroller 21. The motor 12 is also visible.

Among the inputs of the microcontroller 36 (hereinafter reference will be made to the microcontroller 36 implementing the motor controller 24, unless specified otherwise), an input of the position x(t) detected by the sensor 20 and an input of the measured absorbed current I(t) are highlighted. An input of the destination position B and an input of the reference current Iref(t, y(t)) are also highlighted, each of which could however be omitted in case the related values are calculated internally by the microcontroller 36.

Among the outputs of the microcontroller 36, an output of a signal FW(t) addressed to the H bridge 38 for driving the motor 12 in a first direction, and an output of a signal RW(t) addressed to the H bridge 38 for driving the motor 12 in a second direction opposite the first direction are highlighted; the corresponding inputs in the H bridge 38 are also highlighted.

The H bridge 38 is per se conventional, and therefore is not described in detail. The signals FW(t) and RW(t) are signals of the PWM—Pulse Width Modulation—type, as well known. The H bridge 38 allows the voltage across the terminals of the motor 12 to be controlled in amplitude and polarity, by changing the states of conduction and cut off of the switches, which in the case shown are formed by MOSFET.

The shunt 40 that implements the current sensor 28 is connected to the lower side of the H bridge 38 to draw a predetermined fraction of the current that flows in the motor 12.

The measured current I(t) is preferably suitably processed by a processing circuit 42. In the case shown, the processing circuit 42 comprises an RC filter 44 for noise rejection, and an operational amplifier 46. The measured current I(t) can also be converted into digital format by the microcontroller 36, and possibly digitally filtered. In case of digital filtering, the RC filter 44 may be absent. A bypass RC filter 45 for the current is also shown, which may be omitted.

For example, the filtering of the measured absorbed current I(t) can comprise the calculation of a moving average and/or the reading of the position plural times, discarding some readings considered not significant.

The detected position x(t) can be converted into analog format by the microcontroller 36, and possibly analogically and/or digitally filtered.

For example, the filtering of the detected position x(t) can comprise the calculation of a moving average and/or the reading of the position plural times, discarding some readings considered not significant.

The position sensor 20 can be further downstream than the output shaft of the geared motor 16, for example in one of the components of the linkage of the derailleur 10, or at the chain guide.

A method for controlling a motor 12 of a derailleur 10 of a bicycle electronic gearshift according to the invention will now be described, with the aid of some flow charts shown in FIGS. 3-5. The control method can in particular be implemented in the derailleur 10 described above, even more in particular by its controller 14 or by the controller external to the derailleur.

Figure 3:
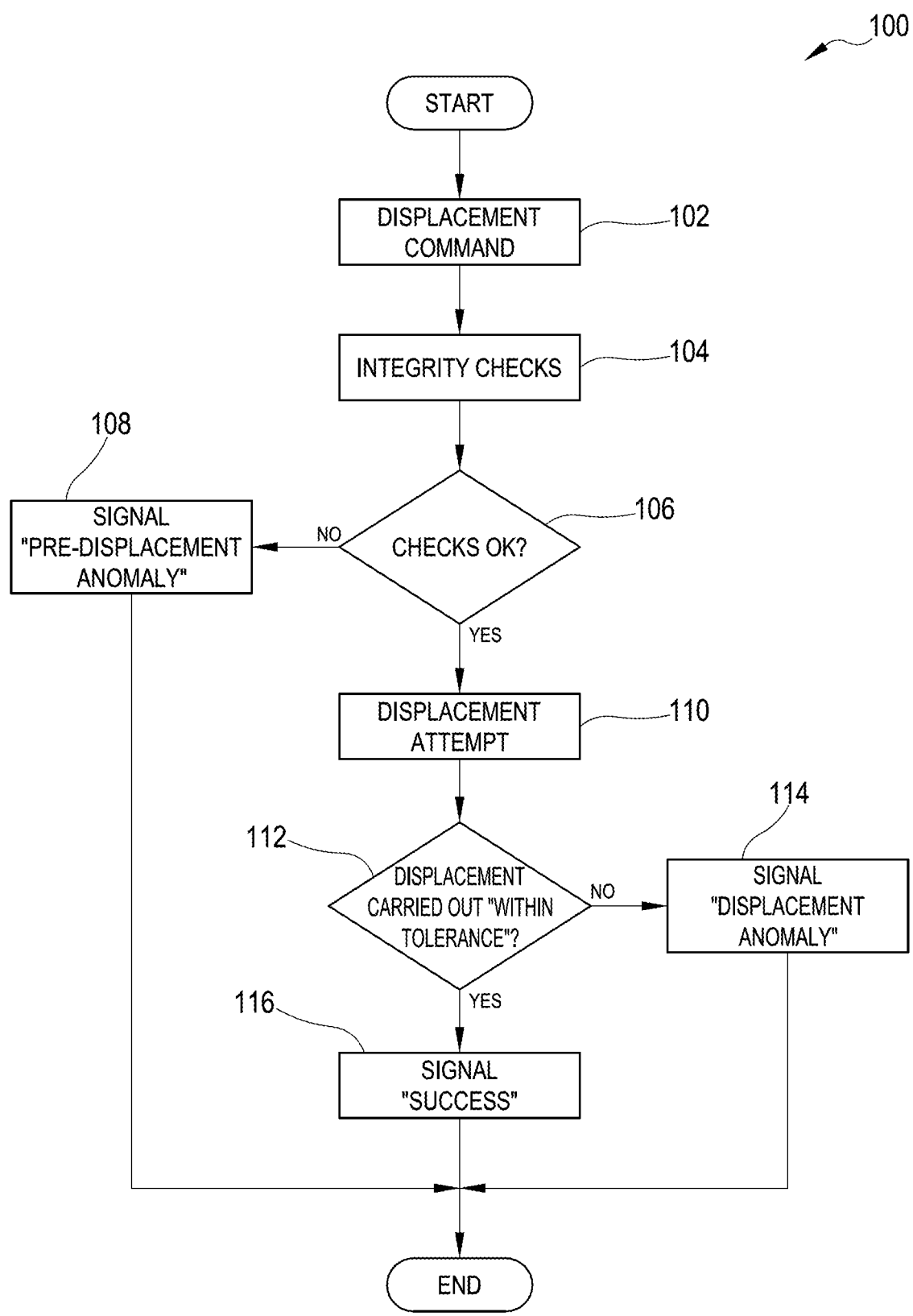

FIG. 3 shows an external or high level routine 100.

In a block 102, a gearshifting command for the purposes of changing gear ratio, or more in general a displacement command of the chain guide, is received or internally generated.

Upon receiving the displacement command and preliminarily to the actuation of the electric motor 12, in a block 104 integrity checks are carried out on the electric motor 12 and/or on electronic components associated therewith, in particular on the driver circuit 18. Such integrity checks can for example provide for the electrical stimulation of some parts of the driver circuit 18 in order to obtain, in response thereto, signals representative of the functionality and of the general status of the hardware components of the driver circuit 18. The integrity checks can alternatively or in addition comprise checks of the charge status of the battery and/or of the functionality of the position sensor 20.

The outcome of such integrity checks is controlled in a block 106.

If any problem related to the hardware components is detected prior to the actuation of the electric motor 12, the outcome of the integrity checks is negative—output NO of block 106—and in this case, in a block 108 a "pre-displacement anomaly" is signaled. The signaling of a "pre-displacement anomaly" can take place, for example, through the setting of a state of a suitable indication variable or flag. The flag is monitored by other control modules of the controller 14 of the derailleur 10 or of another controller of the electronic gearshift, which modules can for example implement suitable corrective actions.

The displacement of the derailleur is therefore not carried out at all, and the method ends.

If, on the other hand, the outcome of the integrity checks is positive—output YES of block 106—in a block 110 one proceeds to a displacement attempt of the derailleur 10 to implement the command received in block 102. The block 110 will be better described hereinafter with reference to FIGS. 4-5.

At the end of the displacement attempt of the derailleur, in a block 112 it is checked whether the destination position B has been reached. Preferably, it is possible to take a certain predetermined range of positioning tolerance into account, namely the final position x(t) achieved by the derailleur 10 is compared with the desired destination position B, and it is checked whether the two positions coincide or are sufficiently close to each other.

If the displacement did not take place at all or took place outside of tolerance—output NO of block 112—in a block 114 a "displacement anomaly" is signaled and the execution of the method ends. A "displacement anomaly" can occur for example due to a physical impediment of the electric motor 12, a failure of the hardware or a software problem.

If, on the other hand, the displacement of the derailleur 10 took place correctly or anyway took place within tolerance, and therefore the check of block 112 has a positive outcome (output YES), in a block 116 the "success" of the operation is signaled.

The "displacement anomaly" and the "success" can also be signaled for example through respective suitable flags.

After the respective signaling of blocks 114, 116, the method ends and the derailleur sets up for receiving a further derailleur displacement command in block 102.

Figure 4:
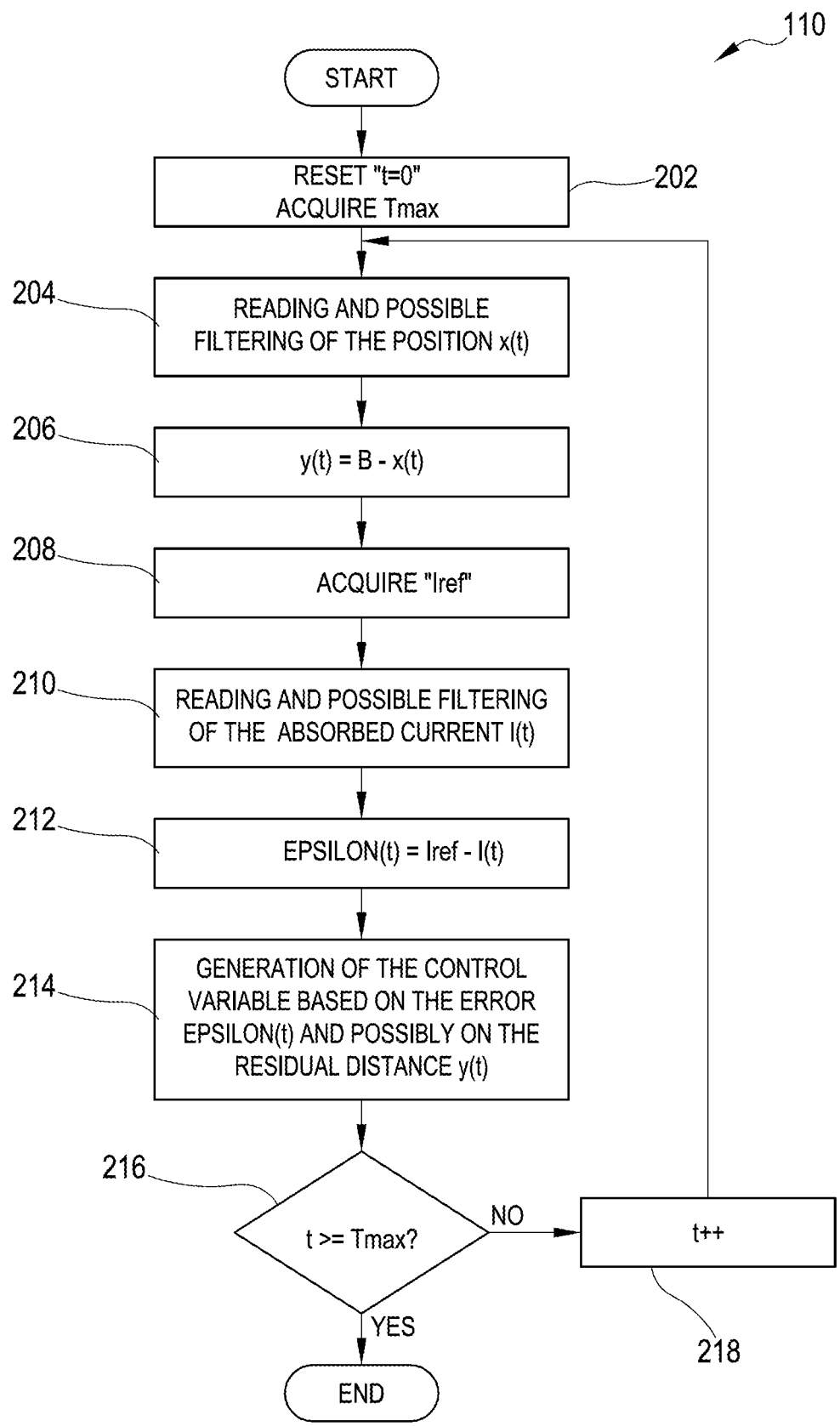

FIG. 4 shows a block diagram relative to an internal or lower level routine 110, which details the aforementioned block 110 of displacement attempt of the derailleur 10.

With reference also to FIG. 6, the derailleur 10 is moved from an initial position A towards a destination position B. FIG. 6 shows the quantities represented by some variables indicated hereinafter.

In an initialization block 202, a variable t representative of the time elapsed during the displacement of the derailleur 10 is zeroed.

Such a variable t is for example implemented through a counter of pulses generated by the clock module 26, so that it assumes discretized time values on a predetermined time base, for example 1 ms.

Moreover, in the initialization block 202 the acquiring of a time limit value Tmax is indicated, which represents the maximum time allowed to complete the displacement of the derailleur 10 into the destination position B.

It should be understood that the acquisition of the time limit value Tmax can in practice be implemented una tantum (once only), for example when the derailleur 10 is switched on.

Thereafter, in a block 204, the current position x(t) of the derailleur 10 is read, for example by the position sensor 20 of FIGS. 1-2, and possibly filtered. The variable x(t) representative of the current position can be digital and take up suitably discretized values, or can be analog.

In a subsequent block 206 a residual distance y(t) is calculated, according to the formula (1):

$$y(t)=B-x(t).$$

In a subsequent block 208 a value of the reference current Iref to be used in the internal feedback loop 34 is acquired, for example through the setting module 30 shown in FIG. 1.

The reference current Iref represents the desired output or setpoint of the derailleur system 10, and it is that current value absorbed by the motor 12 corresponding to a drive torque of desired entity during the displacement of the derailleur 10 into the destination position B. The reference current will be further discussed hereinafter with reference to FIGS. 8-14.

In a block 210, a value of absorbed current I(t) is read and possibly suitably filtered, for example through the current sensor 28 of FIGS. 1-2.

An error EPSILON(t) is then calculated, in a block 212, subtracting the absorbed current I(t) measured in block 210 from the reference current Iref acquired in block 208, according to the formula (2):

$$EPSILON(t)=Iref-I(t).$$

In a block 214, a drive signal for the electric motor 12, which is the control variable of the system represented by the derailleur 10, is generated based on the error EPSILON(t), and possibly based on the residual distance y(t) previously calculated.

In case of a voltage driven electric motor 12, the drive signal is indicated with V(t). In the specific case of a driver circuit 18 in the form of an H bridge 38, the drive signal is more specifically indicated as RW(t), FW(t).

In a subsequent block 216 it is checked whether the elapsed time t is equal to or greater than the time limit Tmax.

If the outcome of the check is negative, output NO of block 216, in a block 218 the time variable t is increased, and execution of block 204 of reading the current position x(t) is returned to.

If, on the other hand, the time limit has elapsed, output YES of block 216, the step of displacing the derailleur (overall represented by block 110 of FIG. 3) ended and block 112 of FIG. 3 is returned to.

Figure 5:
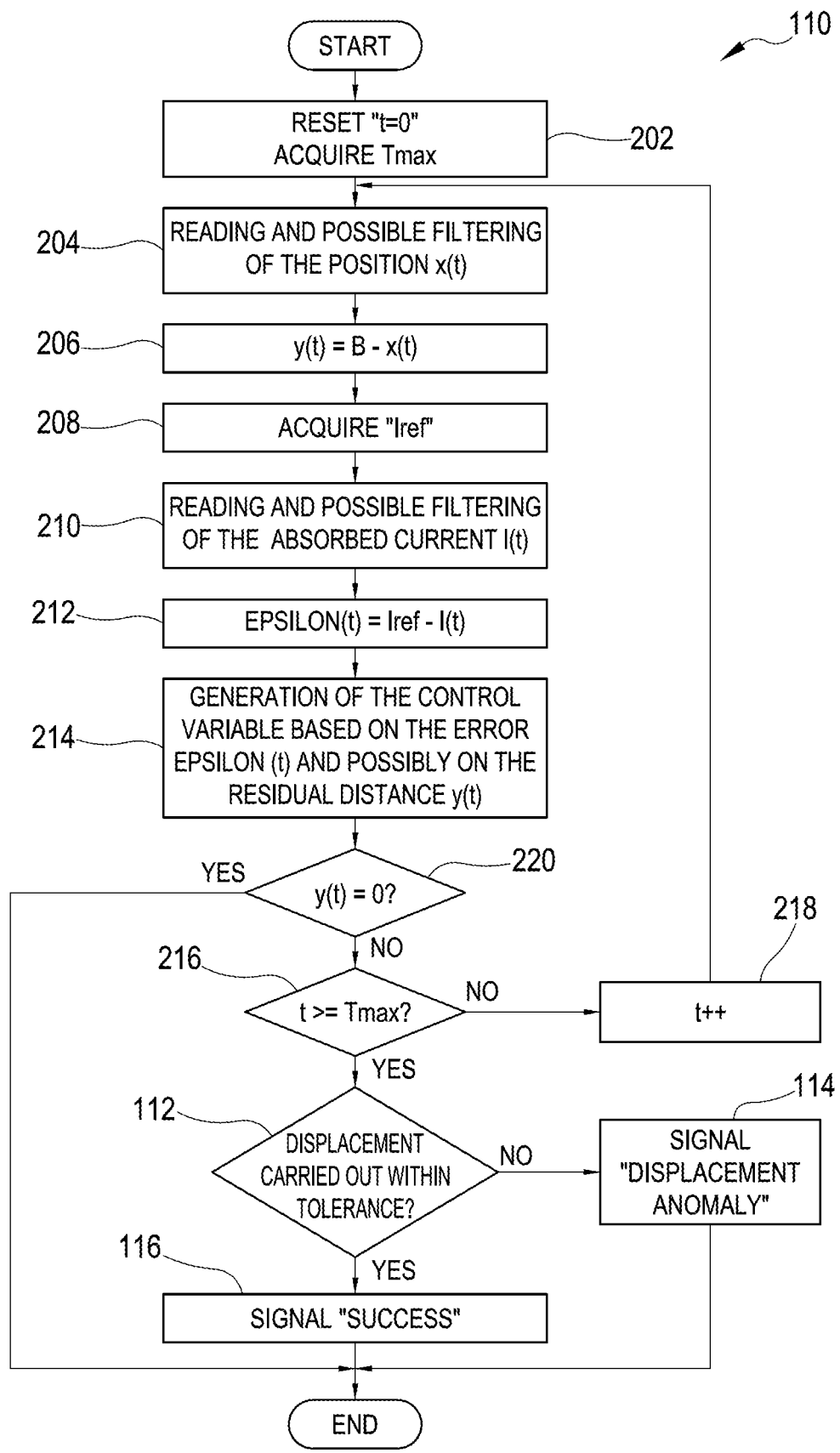

FIG. 5 shows another block diagram that details the aforementioned block 110 of displacement attempt of the derailleur 10, wherein there are some additional controls with respect to what has been described for FIG. 4.

Between the block 214 of generating the drive signal of the motor 12 based on the error EPSILON(t) and the block 216 of checking whether the time limit Tmax has elapsed, in a block 220 it is checked whether the residual distance y(t) is zero, namely whether the destination position B has been reached.

In the affirmative case, output YES of block 220, the method ends. In the negative case, output NO of block 220, the aforementioned block 216 of checking whether the time limit Tmax has elapsed is carried out.

If the time limit Tmax has not elapsed, the execution continues with the increase of the time variable t in block 218.

If, on the other hand, the time limit Tmax has been reached, output YES of block 216, block 112 of checking whether the displacement anyhow took place within tolerance is carried out.

In the affirmative case, output YES of block 112, the aforementioned block 116 of signaling success is carried out, while in the negative case, output NO of block 112, the aforementioned block 114 of signaling "displacement anomaly" is carried out.

After the respective signaling of blocks 114, 116 the method ends and the derailleur 10 is sets up for receiving a further derailleur displacement command in block 102.

It should be understood that, in case block 110 of displacing the derailleur 10 is implemented in the manner just described with reference to FIG. 5, then the blocks 112, 114, 116 will be omitted from the high level routine 100 illustrated in FIG. 3.

An advantage of this embodiment is that, since the expiry of the time limit Tmax is not necessarily awaited, the derailleur 10 is much prompt for a further displacement.

Moreover, it should be noted that, at least in the case of a displacement in order to carry out a change of the gear ratio, it may be suitable for the derailleur 10 to be kept still in the destination position B for a certain time period, in order to allow the actual engagement of the chain with the destination toothed wheel and the stabilization of the mechanisms. In this case, the wait for the time limit Tmax according to the alternative of FIG. 4 does not represent a drawback.

It should be understood that one or more of the signaling of blocks 108, 114, 116 can be omitted.

FIG. 7 is a schematic representation of the method for controlling a motor 12 according to an embodiment of the invention.

The double feedback control 32, 34, both based on the position in the external feedback loop 32, and based on the current I(t) absorbed by the motor 12 in the internal feedback loop 34, is highlighted.

In the case shown, the generation of the control variable of block 214 of FIG. 4 or 5 is implemented through a P.I.D. type controller 48.

In a per se known way, the P.I.D. type controller 48 provides for the separate execution of three actions on the error EPSILON(t), in particular an action 50 of the proportional type P, an action 52 of the derivative type D, and an action 54 of the integrative type I. The respective outputs of the three actions 50, 52, 54 of the P.I.D. controller 48 are summed up by a summing node 56, generating the drive signal V(t) or RW(t), FW(t), respectively, for the electric motor 12.

FIG. 7 also shows a subtracting node 58 that implements the calculation of the error EPSILON(t) of block 212, and a subtracting node 60 that implements the calculation of the residual distance y(t) of block 206.

FIG. 7 also shows a functional block 62 that represents a function F for calculating the reference current Iref. In the most general form, the reference current Iref is a function both of the time variable t, and of the residual distance y(t), as shown by the respective inputs into block 62. It is also shown that the functional block 62 receives as an input the parameter or constant representative of the time limit Tmax.

However, as will be described in greater detail hereinafter with reference to FIGS. 8-14, the functional block 62 is not strictly necessary since the reference current Iref is not necessarily a function depending on the variables and parameter indicated as input to block 62: Iref can also be constant or can be a function of only one or only some of the variables and parameter indicated as input to block 62.

With reference to FIGS. 8-14, some examples are now described of reference currents that can be advantageously used in the method of the invention, and in particular for the step of acquiring the value of the reference current represented by block 208 of FIG. 4 or 5 or, respectively, for carrying out the functional block 62 of FIG. 7 where the reference current is calculated as a function F.

In FIGS. 8-14, the reference current is represented by a surface in the three-dimensional space defined, besides by the axis relative to the reference current Iref, by the independent axes:

time t elapsed since the start of the displacement from the initial position, having origin t=0 at the initial position A, and residual distance y(t) from the destination position B, namely difference between the current position x(t) reached during the displacement from the initial position A towards the destination position B, and the destination position B.

The reference current is therefore expressed in general terms by a function Iref[t, y(t)].

The residual distance y(t) is advantageously—but not necessarily—expressed in terms of a percentage, with respect to the total distance from the initial position A to the destination position B.

The time t is expressed in a suitable unit of measurement, typically in microseconds or in milliseconds.

It should be noted that the residual distance y(t) is a decreasing function of the time t, and it assumes a value of 100% at the initial position A and a value of 0% at the destination position B.

At each iteration of the block 208 of FIGS. 4-5, the module 30 of the controller 14 acquires the value of the reference current Iref[t, y(t)] corresponding to the current value of the elapsed time t and to the current value of the residual distance y(t).

FIGS. 8-14 also illustrate one (or more) curved line(s) that represent(s) a possible "trajectory", namely the locus of points that represent the residual distance at each instant and the corresponding value of the reference current.

Figure 8:
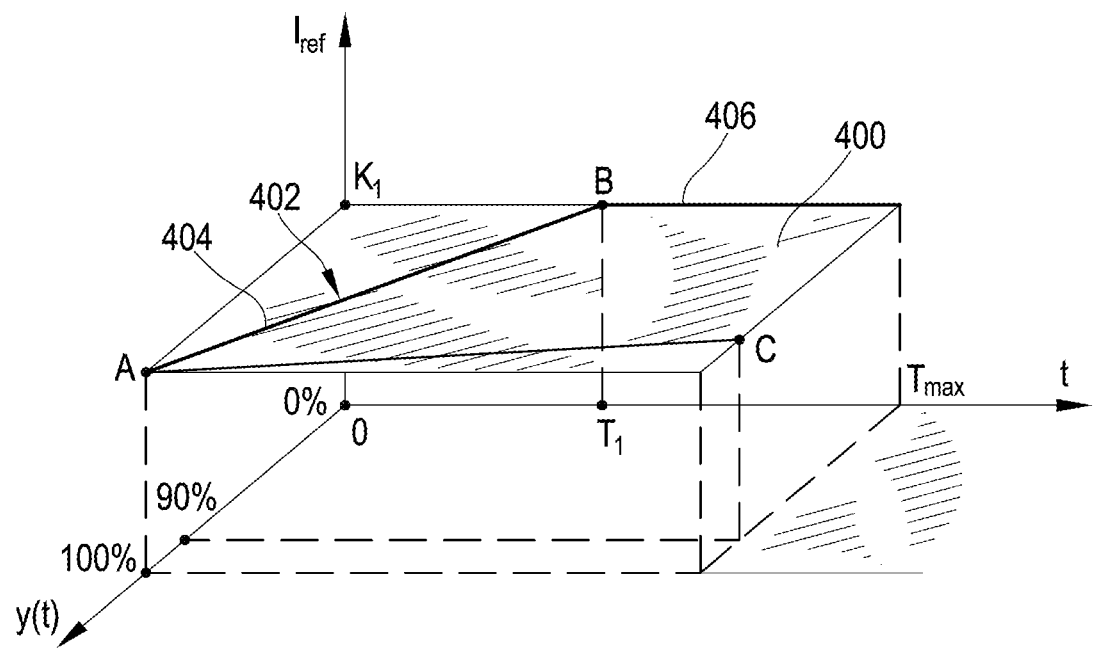
FIGS. 8-14 are representations of a reference current used in the method for controlling the motor of the invention.

FIG. 8 shows a reference current 400 that is actually a constant value independent both from the time t elapsed since the start of the displacement from the initial position A towards the destination position B, and from the residual distance y(t) from the destination position B.

The reference current 400 can therefore be represented, in the module 30 of the controller 14, by a constant value K1 according to the following formula (3):

$$Iref=K1.$$

In the three-dimensional space of FIG. 8, the reference current 400 is represented by a plane parallel to the axes of the elapsed time t and of the residual distance y(t), according to the following formula (4):

$$Iref[t,y(t)]=K1.$$

The exemplary trajectory 402 starts at the initial position A having coordinates t=0, y(0)=100%, Iref(0,100%)=K1. In the case shown, it is presumed that the displacement speed is constant, and therefore the trajectory follows a straight line 404, on the plane representing the reference current Iref, up to the destination position B having coordinates t=T1, y(T1)=0%, Iref(T1,100%)=K1.

Upon reaching the destination position B, the excitation of the motor 12 is interrupted.

In the case represented, it is presumed as an example that the destination position B is reached before the expiry of a time limit Tmax, and that the motor 12 is kept still until the time limit Tmax has expired.

The trajectory 402 therefore comprises a second straight line 406 from the point representative of the destination position B to the point having coordinates t=Tmax, y(Tmax)=0%, Iref(T1, 0%)=K1.

Such a reference function, despite its simplicity, already allows to obtain higher performance of the derailleur 10 with respect to the typical control of the prior art, which provides at most a feedback control of the drive voltage of the motor based on the residual distance from the destination position.

Advantageously, the power supply to the motor 12 is interrupted after a time limit t=Tmax from the start of the displacement, irrespective of whether the destination position B has been reached or not, namely of whether the residual distance y(Tmax) is zero or not.

More specifically, the reference current 400 can therefore be represented, in the module 30 of the controller 14, by a constant value K1 according to the following formula (5):

$$Iref[t,y(t)]=K1 \text{ for } 0<=t<=Tmax$$

$$Iref[t,y(t)]=0 \text{ for } t>Tmax$$

The exemplary trajectory 410 starts at the initial position A having coordinates t=0, y(0)=100%, Iref(0,100%)=K1. In the case shown, it is presumed that the speed of displacement is very low, and therefore the trajectory follows a straight line 412 substantially perpendicular to the axis of the residual distance, up to position C having coordinates t=Tmax, y(Tmax)=90%, Iref(Tmax,90%)=K1. Once the time limit Tmax has expired, therefore, the destination position B has not been reached, but the excitation of the motor 12 is anyway interrupted to protect the motor 12 and the components of the derailleur 10 in case some jamming or other mechanical impediment causes an excessive resistance, that the motor 12 is unable to overcome, and therefore prevents the desired displacement. The charge of the battery for supplying power to the motor 12 is also spared.

It should be understood that in the exemplary case of FIG. 8, the acquisition block 208 of the value of the reference current Iref need not necessarily be carried out at every iteration of the execution as the time t elapses, rather it can be carried out una tantum.

In order to provide a more precise control of the motor 12 of the derailleur 10, a reference current Iref that is a function of the time t elapsed since the start of the displacement from the initial position A to the destination position B can be provided for.

In this way, it is possible to define a predetermined profile over time of the reference current Iref or desired absorbed current, and therefore, thanks to the feedback control 34, a trend of the actually absorbed current I(t) and of the torque actually delivered by the motor 12 that corresponds to or anyway approaches such a predetermined profile.

The reference current Iref can therefore be represented, in the module 30 of the controller 14, by the following general formula (6):

$$Iref=Iref(t)$$

Figure 9:
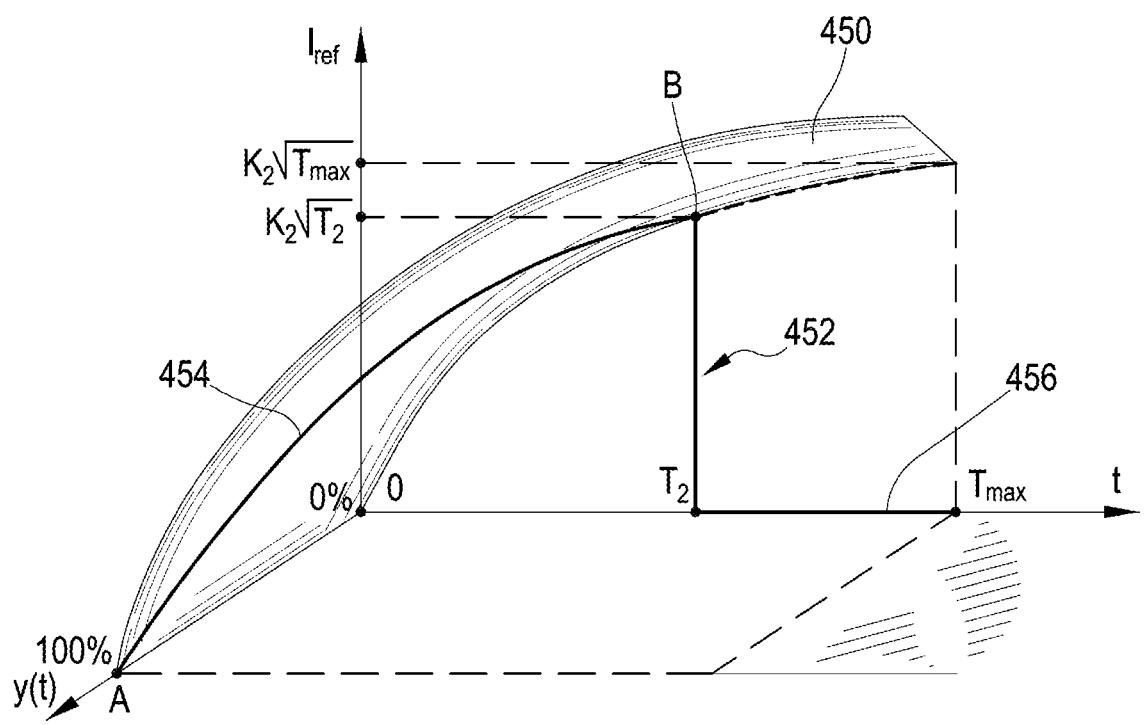

In the three-dimensional space of FIG. 9, the reference current 450 is represented by a curve invariant with respect to the axis of the residual distance, namely having an invariant projection in the plane (t; Iref) according to the following formula (7):

$$Iref[t,y(t)]=Iref[(t)].$$

FIG. 9 shows an exemplary reference current 450 that is a function of the time t elapsed since the start of the displacement from the initial position A to the destination position B.

Advantageously, as shown, the reference current 450 function of the time t has a monotonically increasing trend.

In this way, the torque delivered by the motor 12 increases uniformly and therefore the mechanisms of the derailleur 10 are stressed little.

More in particular, the reference current 450 is defined as an inverse quadratic function of the time t elapsed since the start of the displacement from the initial position A, according to the following formula (8):

$$Iref[t,y(t)]=K2*sqrt(t) \text{ for } 0<=t<=Tmax$$

$$Iref[t,y(t)]=0 \text{ for } t>Tmax$$

where sqrt(z) indicates the square root of z.

It should be noted that also in this case—as well as in the cases described hereinafter—the time limit Tmax is preferably implemented, but this is not strictly necessary.

The exemplary trajectory 452 starts at the initial position A having coordinates t=0, y(0)=100%, Iref(0,100%)=0. In the case shown, it is presumed that the displacement speed is constant, and therefore the trajectory follows a curvilinear line 454, on the curve representing the reference current, up to the destination position B having coordinates t=T2, y(T2)=0%, Iref(T2, 0%)=K2*sqrt(T2).

Once the destination position B has been reached, the trajectory follows a straight line 456, and the excitation of the motor 12 is interrupted until the instant Tmax.

Until such a position, a smooth increase of the torque of the motor 12 is obtained.

Figure 10:
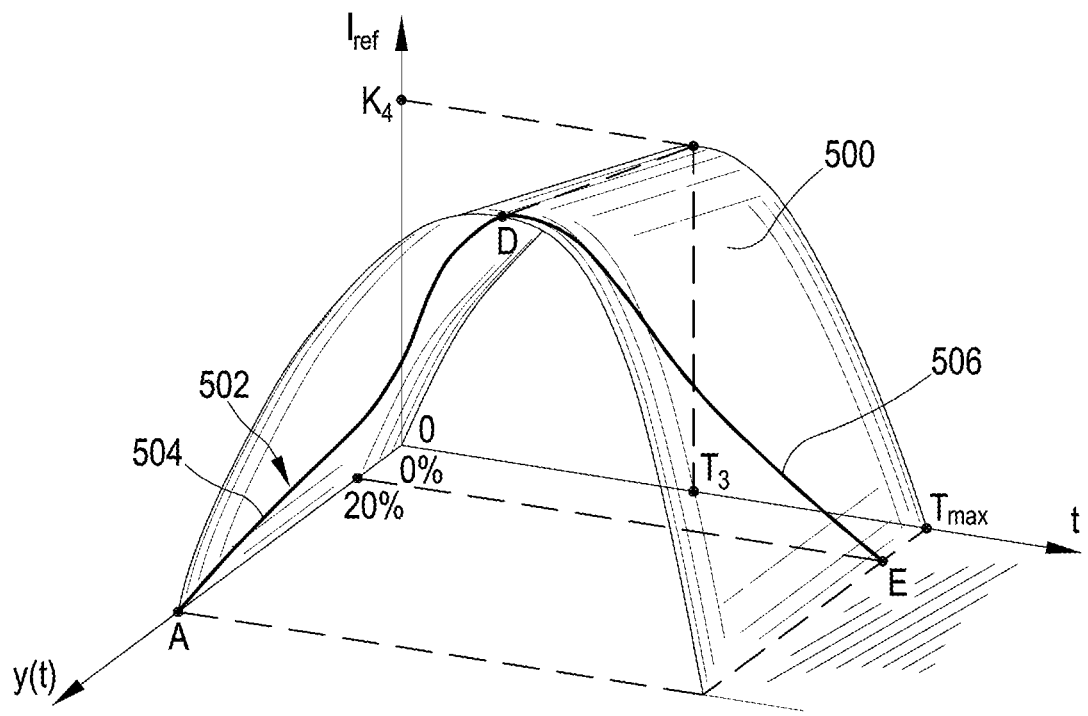

According to another example shown in FIG. 10, it is possible to provide a trend of the reference current Iref, and therefore of the delivered torque, that increases for an initial time interval of the displacement and then decreases as the destination position B approaches.

More in particular, the reference current 500 is defined as a quadratic or parabolic function of the time t elapsed since the start of the displacement from the initial position A, according to the following formula (9):

$$Iref[t,y(t)]=-K3*t^2+K3Tmax*t \text{ for } 0<=t<=Tmax$$

$$Iref[t,y(t)]=0 \text{ for } t>Tmax$$

where z^2 indicates z squared.

It should be noted that also in this case—like in the cases described hereinafter—the time limit Tmax is preferably implemented, but this is not strictly necessary.

The exemplary trajectory 502 starts at the initial position A having coordinates t=0, y(0)=100%, Iref(0,100%)=0. In the case shown, the trajectory follows an ascending curvilinear line 504, on the curve representing the reference current, up to a position D in which the reference current is maximum, with a value K4; thereafter, the trajectory follows a descending curvilinear line 506, on the curve representing the reference current, up to a position E having coordinates t=Tmax, y(Tmax)=20%, Iref(Tmax,20%)=0. Once the time limit Tmax has expired, therefore, the destination position B has not been reached, but the excitation of the motor 12 is anyway interrupted to protect the motor 12 and the components of the derailleur 10 in case some jamming or other mechanical impediment causes an excessive resistance, that the motor 12 is unable to overcome, and therefore prevents the desired displacement. The charge of the battery for supplying power to the motor 12 is also spared.

In a preferred case, the formula (9) is replaced by the following more specific formula (9'):

$$Iref[t,y(t)]=-K3*t^2+2*t \text{ for } 0<=t<=T\text{max}$$

$$Iref[t,y(t)]=0 \text{ for } t>T\text{max}$$

In yet another example, not shown in detail, it is possible to provide for a trend of the reference current Iref, and therefore of the delivered torque, that increases for an initial time interval of the displacement, then is constant, and then decreases as the destination position B approaches.

Another way of providing a precise enough control of the motor 12 of the derailleur 10 consists of providing a reference current Iref that is a function of the residual distance y(t) from the destination position B, but is not a direct function of the time t elapsed since the start of the displacement from the initial position A to the destination position B.

In this way, the profile of the reference current Iref or desired absorbed current, which is then at least approximated by the actually absorbed current, is predetermined in space. For example, it is possible to provide for a trend of the delivered torque that increases for an initial part of the displacement, then is constant and then decreases as the destination position approaches.

The reference current can therefore be represented, in the module 30 of the controller 14, by the following general formula (10):

$$Iref=Iref(y(t))$$

Figure 11:
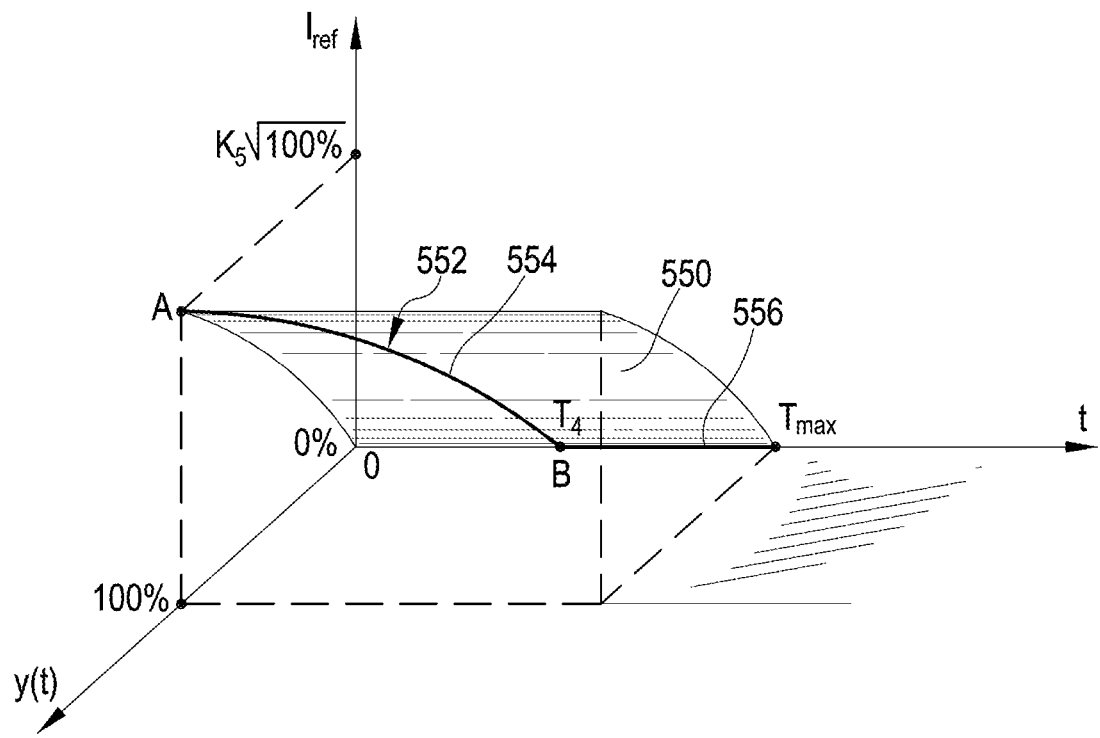

In the three-dimensional space of FIG. 11, the reference current 550 is represented by a curve invariant with respect to the time axis, namely having an invariant projection in the plane (y(t); Iref) according to the following formula (11):

$$Iref[t,y(t)]=Iref(y(t)).$$

FIG. 11 shows an exemplary reference current 550 that is a function of the residual distance y(t) from the destination position B.

Advantageously, as shown, the reference current 550 function of the residual distance has a monotonically increasing trend—and thus decreases smoothly as the destination position B approaches.

Similarly to the case described with reference to FIG. 9, the torque delivered by the motor 12 increases uniformly and therefore the mechanisms of the derailleur 10 are stressed less.

More in particular, the reference current 550 is defined as an inverse quadratic function of the residual distance y(t), according to the following formula (12):

$$Iref[t,y(t)]=K5*\text{sqrt}(y(t)) \text{ for } 0<=t<=T\text{max}$$

$$Iref[t,y(t)]=0 \text{ for } t>T\text{max}.$$

The exemplary trajectory 552 starts at the initial position A having coordinates t=0, y(0)=100%, Iref(0,100%) =K5*sqrt(100%). In the case shown, it is presumed that the displacement speed is constant, and therefore the trajectory follows a curvilinear line 554, on the curve representing the reference current Iref, up to the destination position B having coordinates t=T4, y(T4)=0%, Iref(T4, 0%)=0.

Once the destination position B has been reached, the trajectory follows a straight line 556, and the excitation of the motor 12 is interrupted until the instant Tmax.

Up to such a position, a smooth increase in torque of the motor 12 is obtained.

Figure 12:
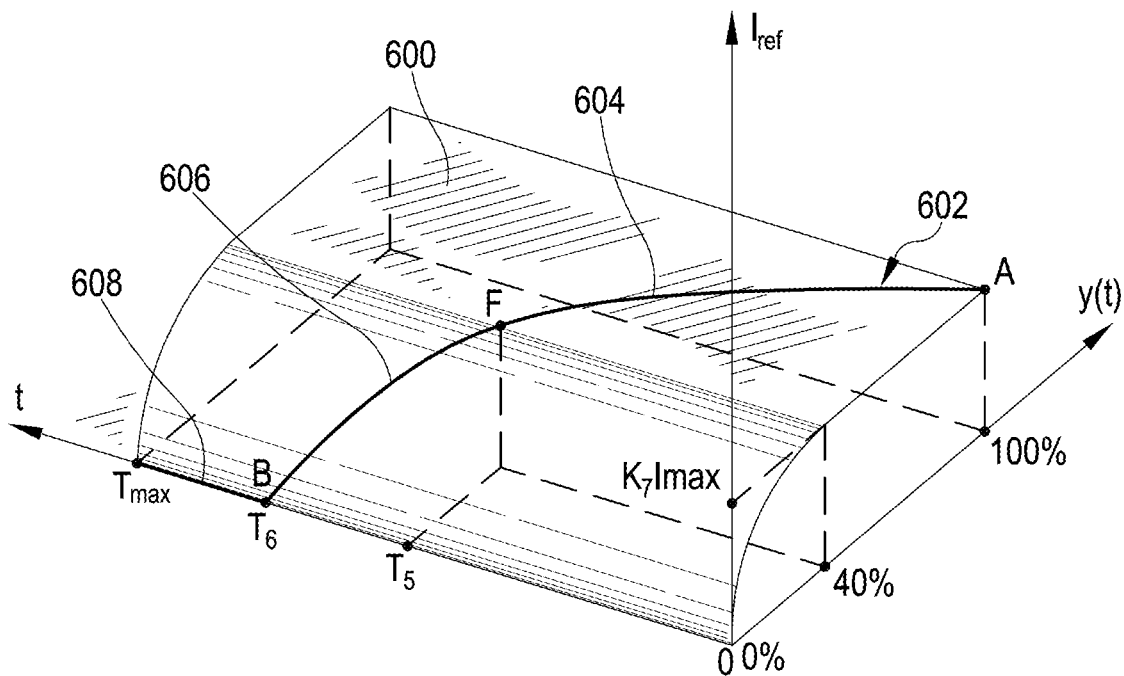

FIG. 12 shows another exemplary reference current 600 that is a function of the residual distance y(t) from the destination position B. It should be noted that the independent axes are inverted with respect to FIGS. 8-11.

The exemplary function shown differs from the one shown in FIG. 11 in that a maximum value for the reference current 600 equal to a predetermined percentage of a maximum current deliverable by the motor 12 is provided for.

By limiting the motor 12 in torque, the maximum force produced at the mechanisms of the derailleur 10 is limited, and therefore undue stresses thereof are avoided.

More in particular, the reference current 600 represented in FIG. 12 is expressed according to the following formula (13):

$$Iref[t,y(t)]=\max(K6*\text{sqrt}(y(t));K7*I\text{Max}) \text{ for } 0<=t<=T\text{max}$$

$$Iref[t,y(t)]=0 \text{ for } t>T\text{max}.$$

The predetermined percentage K7 can for example be equal to 50% of the maximum current IMax that can be delivered by the motor 12.

The exemplary trajectory 602 starts at the initial position A having coordinates t=0, y(0)=100%, Iref(0,100%) =K7*IMax. In the case shown, it is presumed that the displacement speed increases uniformly, and thus the trajectory follows a curvilinear line 604, on the plane representing the maximum value of the reference current 600, up to an intermediate position F between the initial position A and the destination position B, having exemplary coordinates t=T5, y(T5)=40%, Iref(T5,40%)=K6*sqrt(F−B) =K7*IMax, where F−B is the residual distance from the intermediate position F to the destination position B.

The exemplary trajectory 602 then continues along a line 606 of the inverse quadratic curve expressed by K6*sqrt(y (t)), up to the destination position B having coordinates t=T6, y(T6)=0%, Iref(T6,0%)=K6*sqrt(0%).

Once the destination position B has been reached, the trajectory follows a straight line 608, and the excitation of the motor 12 is interrupted until instant Tmax.

In order to provide an extremely precise control of the motor 12 of the derailleur 10, it is possible to provide for a reference current Iref that is a function both of the time t elapsed since the start of the displacement from the initial position A to the destination position B, and of the residual distance y(t) from the destination position B.

In this way, the profile of the reference current Iref or desired absorbed current, which is then at least approximated by the actually absorbed current I(t), is predetermined over time, but also adapted in an optimal manner in space. For example, it is possible to provide for a trend of the delivered torque that increases for an initial time interval of the displacement, then is constant and then decreases as the destination position B approaches.

The reference current Iref can therefore be represented, in the module 30 of the controller 14, by the following general formula (14):

$$Iref=Iref(t,y(t))$$

Figure 13:
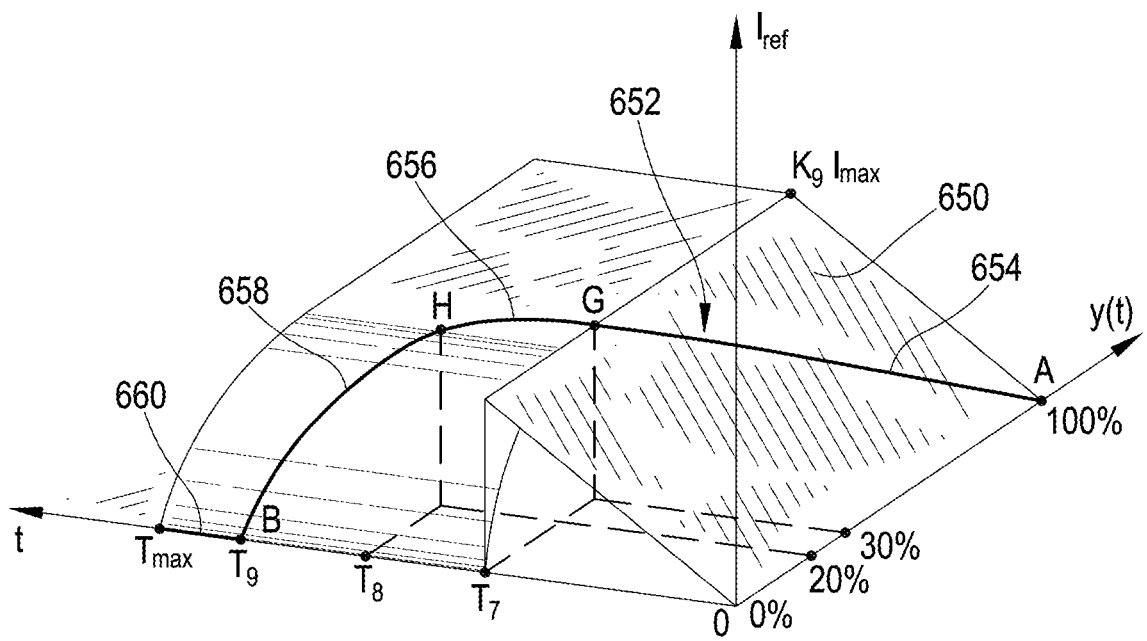

In the three-dimensional space of FIG. 13, the reference current 650 is represented by a curve that is invariant neither with respect to the time axis t, nor with respect to the residual distance axis y(t), although it may have invariant portions with respect to either axis. Therefore, the reference current 650 is represented by a curve that is a variable function both along the time axis t, and along the residual distance axis y(t).

FIG. 13 shows an exemplary reference current 650 that is a function both of the elapsed time t and of the residual distance y(t) from the destination position B. It should be noted that the independent axes are inverted with respect to FIGS. 8-11, similarly to FIG. 12.

Advantageously, as shown, the reference current 650 has an initial trend monotonically increasing with time t and invariant with the residual distance y(t), and a final trend invariant in time t and monotonically increasing with the residual distance y(t)—and that therefore monotonically decreases as the destination position B approaches. Furthermore, also in this case a maximum value is provided for the reference current 650, equal to a predetermined percentage of a maximum current deliverable by the motor 12.

More in particular, the reference current 650 is defined as a ramp function in the initial portion and an inverse quadratic function of the residual distance y(t) in the final portion, and it is further limited, according to the following formula (15):

$$Iref[t,y(t)] = \max(K8*t; K9*IMax) \text{ for } 0<=t<=T7$$

$$Iref[t,y(t)] = \max(K10*sqrt(y(t)); K9*IMax) \text{ for } T7<=t<=Tmax$$

$$Iref[t,y(t)] = 0 \text{ for } t>Tmax.$$

The exemplary trajectory 652 starts at the initial position A having coordinates t=0, y(0)=100%, Iref(0,100%)=0. In the case shown, it is presumed that the displacement speed is initially constant, and therefore the trajectory follows a straight line 654, on the plane representing the growth ramp of the reference current 650, up to the intermediate position G between the initial position A and the destination position B, having exemplary coordinates t=T7, y(T7)=30%, Iref(T7, 30%)=K9*IMax.

The trajectory 652 follows a straight line 656, on the plane representing the maximum value of the reference current 650, up to the intermediate position H between the intermediate position G and the destination position B, having exemplary coordinates t=T8, y(T8)=20%, Iref(T8,20%) =K10*sqrt(20%)=K9*IMax.

The exemplary trajectory 652 then continues along a line 658 of the inverse quadratic curve expressed by K10*sqrt (y(t)), up to the destination position B having coordinates t=T9, y(T9)=0%, Iref(T9,0%)=0.

Once the destination position B has been reached, the trajectory follows a straight line 660, and the excitation of the motor 12 is interrupted until instant Tmax.

Figure 14:
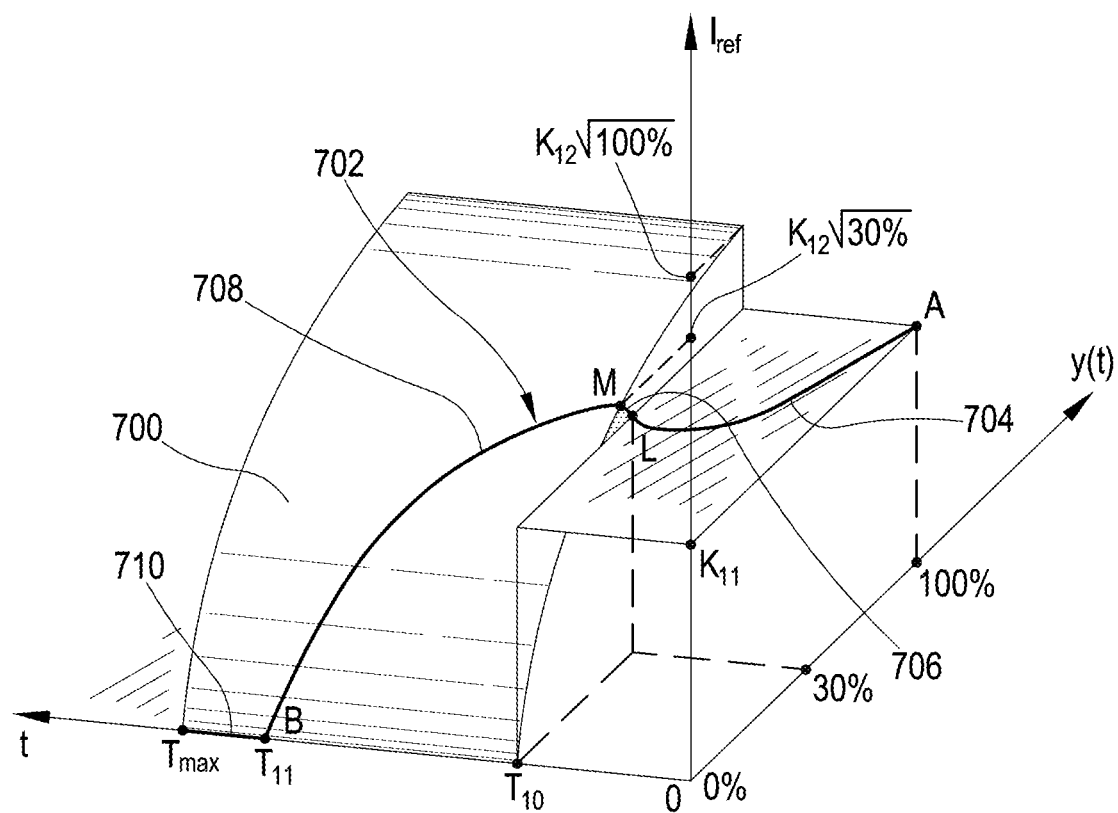

FIG. 14 shows another exemplary reference current 700 that is a function both of the elapsed time t and of the residual distance y(t).

In particular, the reference current 700 has a constant value for a predetermined time interval during the displacement, in particular in an initial time interval of the displacement. In this way it is possible to start or attempt to start the displacement in a predetermined manner, deferring the possible evaluations of the reaction of the mechanisms to a second part of the displacement.

The constant value is an intermediate value with respect to the maximum possible value for the reference current 700 for the rest of the displacement.

In this way, at the end of the predetermined time interval it is in general provided for a sudden transition of the value of the reference current 700, and in particular a sudden raise of the reference current 700, which allows a torque boost to be provided to try to overcome a possible temporary impediment to the movement of the mechanisms.

In the second part of the displacement, an average quadratic function of the residual distance y(t) is provided as an example.

More in particular, the reference current 700 is defined as constant in the initial portion, and as an inverse quadratic function of the residual distance y(t) in the final portion, according to the following formula (16):

$$Iref[t,y(t)] = K11 \text{ for } 0<=t<=T10$$

$$Iref[t,y(t)] = K12*sqrt(y(t)) \text{ for } T10<=t<=Tmax$$

$$Iref[t,y(t)] = 0 \text{ for } t>Tmax$$

where K11 is an intermediate value with respect to the maximum possible value for the reference current K12*sqrt (100%).

The exemplary trajectory 702 starts at the initial position A having coordinates t=0, y(0)=100%, Iref(0,100%)=K11. In the case shown, it is presumed that the displacement speed initially increases uniformly, and therefore the trajectory follows a curvilinear line 704, on the plane representing the reference current 700 constant at the intermediate value, up to the intermediate position L between the initial position A and the destination position B, having exemplary coordinates t=T10, y(T10)=30%, Iref(T10,30%)=K11.

The trajectory 702 then undergoes a sudden transition and in particular a sudden raise 706 of the reference current 700, which in the intermediate position M goes to the value Iref(T10,30%)=K12*sqrt(30%). In this way, the motor 12 provides a torque boost to try to overcome a possible temporary impediment to the movement of the mechanisms of the derailleur 10.

The exemplary trajectory 702 then continues along a line 708 of the inverse quadratic curve expressed by K12*sqrt (y(t)), up to the destination position B having coordinates t=T11, y(T11)=0%, Iref(T11,0%)=0.

Once the destination position B has been reached, the trajectory follows a straight line 710, and the excitation of the motor 12 is interrupted until instant Tmax.

Those skilled in the art will understand that the various exemplary functions represented for the various parts of the displacement from the initial position A to the destination position B may be combined with one another in various ways, in order to obtain the advantageous results outlined in the above description.

Those skilled in the art will also understand that the various exemplary functions represented for the various parts of the displacement from the initial position A to the destination position B may undergo several modifications, and that the reference current Iref can in principle follow any trend.

In particular, although flat or curvilinear regions of the function describing the reference current Iref have been shown, having a strictly monotonic trend with respect to an axis, the trend can be monotonic but not strictly.

Although functions describing the reference current Iref have been shown divided into no more than three regions, this shall not to be intended as an absolute limit, and the reference current Iref can be established according to any complex function.

Furthermore, although the function describing the reference current Iref has been expressed through formulae, this shall not to be intended as an absolute requirement, and the reference current Iref can be defined point by point, for example through a look-up table.

Those skilled in the art will understand that, as an alternative to the signal for voltage driving the electric motor 12, the electric motor 12 may be current driven.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

What is claimed is:

1. A method for controlling a motor of a derailleur of a bicycle electronic gearshift during a displacement from an initial position to a destination position, the method comprising a step of feedback controlling a current (I(t)) absorbed by the motor during the displacement from the initial position to the destination position by controlling a drive voltage (V(t), FW(t), RW(t)) of the motor such that the drive voltage (V(t), FW(t), RW(t)) of the motor is adjusted throughout the displacement from the initial position to the destination position, the step of feedback controlling a measured current (I(t)) absorbed by the motor comprises controlling the drive voltage (V(t), FW(t), RW(t)) of the motor so that an error (EPSILON(t)) defined by a difference between a reference current (Iref(t), Iref(y(t)), Iref(t,y(t))) and the measured current (I(t)) absorbed by the motor tends to become zero.

2. The method according to claim 1, comprising defining the reference current (Iref(t)) as a function of time, more in particular a direct function of the time (t) elapsed since a start of the displacement from the initial position to the destination position.

3. The method according to claim 1, comprising defining the reference current (Iref(y(t))) as a function of a residual distance (y(t)) from the destination position.

4. The method according to claim 1, comprising defining the reference current (Iref(t,y(t))) as a function both of a time (t) elapsed since a start of the displacement from the initial position to the destination position, and of a residual distance (y(t)) from the destination position.

5. The method according to claim 2, comprising defining the reference current (Iref(t)) as a monotonically increasing function of the elapsed time (t), at least in an initial time interval of the displacement.

6. The method according to claim 3, comprising defining the reference current (Iref(y(t))) as a monotonically increasing function of the residual distance (y(t)), at least in a final part of the displacement.

7. The method according to claim 1, further comprising a step of interrupting a power supply to the motor after a time limit (Tmax), irrespective of whether the destination position has been reached or not.

8. The method according to claim 1, wherein the step of feedback controlling the current (I(t)) absorbed by the motor comprises measuring the absorbed current (I(t)) and filtering the measured current (I(t)) absorbed by the motor, more preferably analogically and/or digitally filtering.

9. The method according to claim 1, comprising a step, preliminary to a step of displacement attempt, of carrying out integrity checks of a controller of the motor, and in a negative case aborting the displacement and signaling anomalies and/or a step, subsequent to the step of displacement attempt, of checking whether the destination position has been reached within a certain tolerance, and in a negative case aborting the displacement and signaling an anomaly.

10. A derailleur of a bicycle electronic gearshift, the derailleur comprising:

an electric motor, and a controller of the electric motor, wherein the controller of the electric motor is configured to carry out a feedback control of a current (I(t)) absorbed by the motor during a displacement from an initial position to a destination position such that a drive voltage (V(t), FW(t), RW(t)) of the motor is adjusted throughout the displacement from the initial position to the destination position, the feedback control of a measured current (I(t)) absorbed by the motor comprises controlling the drive voltage (V(t), FW(t), RW(t)) of the motor so that an error (EPSILON(t)) defined by a difference between a reference current (Iref(t), Iref(y(t)), Iref(t,y(t))) and the measured current (I(t)) absorbed by the motor tends to become zero.

11. An assembly of a derailleur of a bicycle electronic gearshift, the assembly comprising:

an electric motor, and a controller of the electric motor external to the derailleur, wherein the controller of the electric motor is configured to carry out a feedback control of a current (I(t)) absorbed by the motor during a displacement from an initial position to a destination position such that a drive voltage (V(t), FW(t), RW(t)) of the motor is adjusted throughout the displacement from the initial position to the destination position, the feedback control of a measured current (I(t)) absorbed by the motor comprises controlling the drive voltage (V(t), FW(t), RW(t)) of the motor so that an error (EPSILON(t)) defined by a difference between a reference current (Iref(t), Iref(y(t)), Iref(t,y(t))) and the measured current (I(t)) absorbed by the motor tends to become zero.

12. A bicycle electronic gearshift comprising:

at least one derailleur having an electric motor, and a controller of the electric motor, said at least one derailleur configured to displace a chain among toothed wheels of a set of toothed wheels associated with an axle of pedal cranks or with a hub of a rear wheel of a bicycle, respectively, wherein the controller of the electric motor is configured to carry out a feedback control of a current (I(t)) absorbed by the motor during a displacement from an initial position to a destination position such that a drive voltage (V(t), FW(t), RW(t)) of the motor is adjusted throughout the displacement from the initial position to the destination position, the feedback control of a measured current (I(t)) absorbed by the motor comprises controlling the drive voltage (V(t), FW(t), RW(t)) of the motor so that an error (EPSILON(t)) defined by a difference between a reference current (Iref(t), Iref(y(t)), Iref(t,y(t))) and the measured current (I(t)) absorbed by the motor tends to become zero.

13. The derailleur according to claim 10, wherein the controller of the electric motor carries out a feedback control of a residual distance (y(t)) from the destination position, said feedback control of the residual distance (y(t)) being a control loop external with respect to said feedback control of the current (I(t)) absorbed by the motor.

14. The derailleur according to claim 10, wherein the controller comprises an H bridge for driving the electric motor and a shunt connected to a lower side of the H bridge to draw a current representative of the current (I(t)) to be measured.

15. The method according to claim 4, comprising defining the reference current (Iref(t,y(t))) as a monotonically increasing function of the elapsed time (t), at least in an initial time interval of the displacement.

16. The method according to claim 4, comprising defining the reference current (Iref(t,y(t))) as a monotonically increasing function of the residual distance (y(t)), at least in a final part of the displacement.

17. The assembly according to claim 11, wherein the controller of the electric motor carries out a feedback control of a residual distance (y(t)) from the destination position, said feedback control of the residual distance (y(t)) being a control loop external with respect to said feedback control of the current (I(t)) absorbed by the motor.

18. The bicycle electronic gearshift according to claim 12, wherein the controller of the electric motor carries out a feedback control of a residual distance (y(t)) from the destination position, said feedback control of the residual distance (y(t)) being a control loop external with respect to said feedback control of the current (I(t)) absorbed by the motor.

19. The assembly according to claim 11, wherein the controller comprises an H bridge for driving the electric motor and a shunt connected to a lower side of the H bridge to draw a current representative of the current (I(t)) to be measured.

20. The bicycle electronic gearshift according to claim 12, wherein the controller comprises an H bridge for driving the electric motor and a shunt connected to a lower side of the H bridge to draw a current representative of the current (I(t)) to be measured.

21. The method according to claim 1, wherein the reference current (Iref(t), Iref(y(t)), Iref(t,y(t))) is defined as a constant value that is independent of both:
 (i) time (t) elapsed since a start of the displacement from the initial position to the destination position, and
 (ii) residual distance (y(t)) from the destination position.

22. The method according to claim 1, wherein the reference current (Iref(t), Iref(y(t)), Iref(t,y(t))) is variable.

* * * * *